US010038499B2

(12) United States Patent
Birnbaum

(10) Patent No.: US 10,038,499 B2
(45) Date of Patent: Jul. 31, 2018

(54) INTENSITY MODULATED DIRECT DETECTION BROAD OPTICAL-SPECTRUM SOURCE COMMUNICATION

(71) Applicant: Facebook, Inc., Menlo Park, CA (US)

(72) Inventor: Kevin Michael Birnbaum, Reseda, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/984,093

(22) Filed: Dec. 30, 2015

(65) Prior Publication Data
US 2017/0195057 A1  Jul. 6, 2017

(51) Int. Cl.
*H04B 10/112* (2013.01)
*H04B 10/516* (2013.01)
*H04B 10/50* (2013.01)

(52) U.S. Cl.
CPC ......... *H04B 10/112* (2013.01); *H04B 10/501* (2013.01); *H04B 10/516* (2013.01)

(58) Field of Classification Search
CPC ..... H04B 10/506; H04B 10/11–10/116; H04B 10/502
See application file for complete search history.

(56) References Cited

U.S. PATENT DOCUMENTS

| 4,521,075 A * | 6/1985 | Obenschain ........... B23K 26/06 |
| | | 359/569 |
| 5,339,177 A | 8/1994 | Jenkins et al. |
| 6,097,861 A | 8/2000 | Kim et al. |
| 6,731,878 B1 | 5/2004 | Britz et al. |

(Continued)

FOREIGN PATENT DOCUMENTS

| EP | 2838217 A1 | 2/2015 |
| JP | 2013535871 A | 9/2013 |
| KR | 1020140075861 A | 6/2014 |
| WO | 2005002102 A1 | 1/2005 |
| WO | 2005119942 A2 | 12/2005 |

OTHER PUBLICATIONS

Non-Final Office Action dated Dec. 2, 2016, for U.S. Appl. No. 14/984,173, of Wang, S.C., filed Dec. 30, 2015.

(Continued)

*Primary Examiner* — David Payne
*Assistant Examiner* — Casey Kretzer
(74) *Attorney, Agent, or Firm* — FisherBroyles, LLP

(57) ABSTRACT

Optical systems and methods for transmission of multiple beams and direct detection of those beams are described. One transmitter for use in a free space optical communication system includes a broad spectrum light source and an optical component including a plurality of sections positioned to receive an optical beam produced by the broad spectrum light source. The sections of the optical component are formed to introduce optical path differences into portions of the optical beam that impinge on the optical component such that each section introduces a delay into a corresponding portion of the optical beam. The introduced delays cause each portion of the optical beam to lack coherence with other portions of the optical beam. A direct detection receiver detects the intensity of the aggregate beams and produces a signal with improved signal-to-noise ratio. The disclosed technology can be used with modulated optical beams such as intensity modulated beams.

14 Claims, 8 Drawing Sheets

(56) References Cited

U.S. PATENT DOCUMENTS

| | | | |
|---|---|---|---|
| 6,807,375 B2 * | 10/2004 | Dogariu | H04B 10/1121 398/118 |
| 7,643,754 B2 | 1/2010 | Futami et al. | |
| 7,920,794 B1 * | 4/2011 | Whaley | H04B 10/1125 398/122 |
| 2002/0126479 A1 | 9/2002 | Zhai et al. | |
| 2004/0052535 A1 * | 3/2004 | Nohara | H04B 10/11 398/189 |
| 2004/0239946 A1 * | 12/2004 | Kane | G01J 3/453 356/497 |
| 2005/0196170 A1 | 9/2005 | Winsor et al. | |
| 2006/0078251 A1 | 4/2006 | Ducellier et al. | |
| 2006/0088319 A1 | 4/2006 | Morton et al. | |
| 2008/0002986 A1 | 1/2008 | Izumi et al. | |
| 2009/0324243 A1 | 12/2009 | Neilson et al. | |
| 2010/0053474 A1 | 3/2010 | Kamei et al. | |
| 2011/0164884 A1 * | 7/2011 | Yamada | H04B 10/116 398/172 |
| 2012/0230685 A1 | 9/2012 | Jung et al. | |
| 2014/0029941 A1 | 1/2014 | Bratkovski et al. | |
| 2017/0195061 A1 | 7/2017 | Wang | |

OTHER PUBLICATIONS

U.S. Appl. No. 14/984,173 by S. Wang, filed Dec. 30, 2015.
International Search Report and Written Opinion in International Application No. PCT/US2016/069019, dated Apr. 17, 2017, 9 pages.
International Search Report and Written Opinion in International Application No. PCT/US2016/069033, dated Apr. 17, 2017, 9 pages.
Yahya, M., et al., "Transmit optics analysis for Free Space Optics improvements." IEEE International RF and Microwave Conference, Mar. 15, 2012, pp. 262-263.
Notice of Allowance dated Aug. 30, 2017 for U.S. Appl. No. 14/984,173, of Wang, S.C., filed Dec. 30, 2015.

* cited by examiner

202

206

INTENSITY MODULATED DIRECT DETECTION BROAD OPTICAL-SPECTRUM SOURCE COMMUNICATION

TECHNICAL FIELD

The subject matter of this patent document generally relates to detection of optical signals and, more specifically, to a direct detection of multiple optical signals from a source having a broad spectrum.

BACKGROUND

Wireless communication systems transfer data from a transmitter of one station to a receiver of another station. In some applications, one of the stations can be ground based (i.e., stationary) while the other station is carried by a flying vehicle (e.g., a satellite in Earth's orbit, an airplane or an unmanned aerial vehicle (UAV)). Furthermore, multiple stations can be ground based and in communication with one or more flying objects, both stations can be part of flying vehicles, or both stations can be ground-based. These wireless communication systems are sometimes used for Internet connections, especially if the land-based network is underdeveloped. These ground/airborne communication systems have to uplink (UL) and downlink (DL) large and ever-increasing volumes of data. Such large volumes of data form today's complex telecommunication devices and networks, and are fast outpacing bandwidth offered by today's satellite communications technology. Airborne vehicles typically communicate with other airborne or ground-based stations using microwave or radiofrequency (RF) bands. However, a major challenge for conventional microwave and RF communications is the highly constrained spectrum allocation imposed on these communication bands.

Free-space optical (laser) communications (FSO or Lasercom) is immune to spectrum allocation due to virtually unlimited bandwidth of the optical regions (greater than 100 THz). While experimental FSO technology is now downlinking data at 10's of Gb/s from air or space, these solutions are complex and expensive, require relatively large components, and consume large amounts of power. One of the challenges associated with free space optical communications is atmospheric turbulence that interferes with the optical signals that traverse through large sections of the atmosphere.

DETAILED DESCRIPTION

Figure 1A:
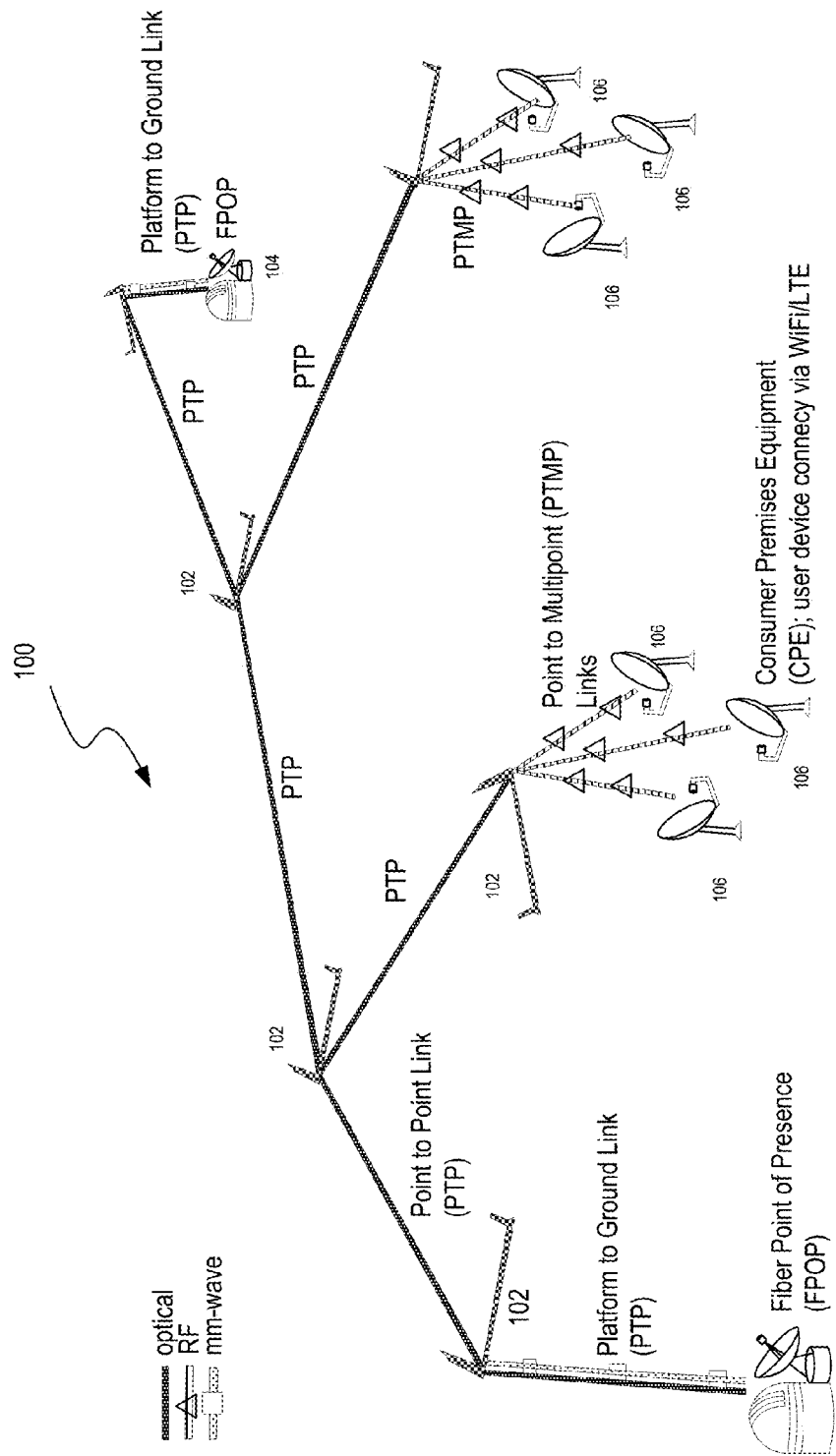
FIG. 1A is a block diagram illustrating a free space communication system within which the disclosed technology can be implemented.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

The disclosed embodiments facilitate transmission and direct detection of optical signals in a free space optical communication system using a broad spectrum optical source. One aspect of the disclosed embodiments relates to an optical transmitter for transmitting light in a free space optical communication system that includes a broad spectrum light source, and an optical component including a plurality of sections that are positioned to receive an optical beam produced by the broad spectrum light source. The plurality of sections of the optical components are formed to introduce optical path differences into portions of the optical beam that impinge on the optical component such that each section introduces a delay into a corresponding portion of the optical beam that is different from a delay introduced into other portions of the optical beam by other sections of the optical component. The delays introduced by the plurality of sections cause each portion of the optical beam that impinges on a corresponding section of the optical component to lack coherence with other portions of the optical beam that impinge on other sections of the optical component.

In some embodiments, the optical beam received by the optical component is a modulated optical beam having a modulation rate, r, and each of the plurality of sections of the optical component is formed to produce a particular optical path difference that is smaller than c/r, where c is the speed of light in vacuum. For example, the optical path difference is at least an order of magnitude smaller than c/r. In some embodiments, each of the plurality of sections of the optical component is formed to produce a particular optical path difference that is larger than c/Δf, where c is the speed of light in vacuum and Δf is the spectral bandwidth of the broad spectrum light source. For example, optical path difference is at least two orders of magnitude larger than c/Δf.

In some embodiments, the optical beam received by the optical component is one of an intensity modulated optical beam. In some embodiments, the broad spectrum light source is one of: a broad-band laser diode (LD), a super-luminescent diode (SLD), a light-emitting diode (LED), or an amplified spontaneous emission (ASE) source. In some embodiments, the optical beam received by the optical component is a modulated optical beam having a modulation rate, r, and the light source has a spectral bandwidth that is larger than r. For example, the spectral bandwidth is at least 2 orders of magnitude larger than r. In some embodiments, the optical component is a Fresnel lens with a plurality of circular zones, and each of the plurality of sections of the optical component corresponds to one circular zone of the Fresnel lens.

In some embodiments, the optical component is a plate with a step-like spatial profile including a plurality of segments, and each of the plurality of sections of the optical component corresponds to one segment of the plurality of segments of the plate. In some embodiments, the broad spectrum light source and the optical component are located inside one or both of (a) an unmanned flying vehicle or (b) a ground-based station, and the optical component is positioned to provide a plurality of the portions of optical beam, after propagation through the multiple sections of the optical component, for transmission onto atmosphere. In some embodiments, the optical component is positioned at the exit aperture of the optical transmitter.

Another aspect of the disclosed embodiments relates to a free space optical communication system that includes a transmitter and a receiver. The transmitter of the system includes a broad spectrum light source and an optical component that includes a plurality of sections and is positioned to receive an optical beam produced by the broad spectrum light source. The plurality of sections of the optical component are formed to introduce optical path differences into portions of the optical beam that impinge on the optical component such that each section introduces a delay into a corresponding portion of the optical beam that is different from a delay introduced into other portions of the optical beam by other sections of the optical component. The delays introduced by the plurality of sections of the optical component also cause each portion of the optical beam that impinges on a corresponding section of the optical component to lack coherence with other portions of the optical beam that impinge on other sections of the optical component. The receiver of the above described system is positioned to receive a plurality of the portions of the optical beam that exits the optical component of the transmitter after propagation through atmosphere. The receiver includes a photodetector to sense an intensity of the received portions of the optical beam, and enables detection of the received optical beam using a direct detection technique.

Figure 1B:
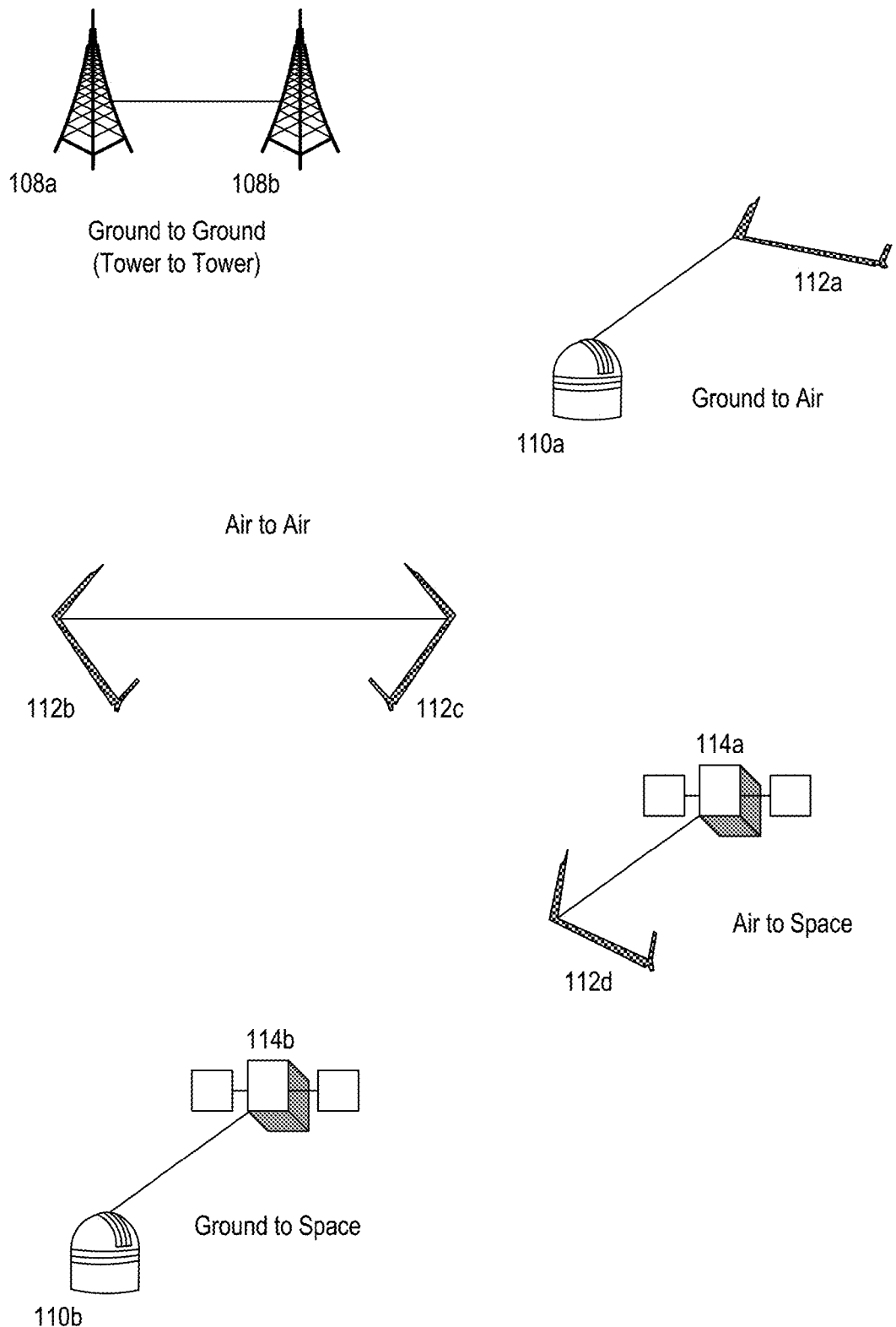
FIG. 1B is a simplified diagram of communication links between ground-based, air-based and space-based stations.

Turning now to figures, FIG. 1A is a block diagram illustrating a free space communication system 100 that uses a variety of optical, RF and mm-wave communication links. The communication links in FIG. 1A can be established among moving and stationary components, including aircraft 102 (e.g., UAVs) and ground-based stations 104, 106. FIG. 1B is a simplified diagram that illustrates communications between a variety of ground-based, air-based and space-based stations. In particular, FIG. 1B shows ground-to-ground communications between two ground-based stations, such as towers 108a,108b, ground-to-air communications between a ground-based station 110a and an airborne station 112a, air-to-air communications between two air-based stations 112b, 112c, air-to-space communications between an air-based station 112d and a space-based station 114a, and ground-to-space communications between a ground-based station 110b and a space-based station 114b.

The disclosed embodiments can be used to facilitate free-space communications among any of the above described ground, air or space-based stations.

Detection of optical signals in such systems is carried out using what is traditionally classified as either a coherent detection technique or a direct detection technique. In coherent detection, information regarding the phase of the modulated optical signal is used to recover the information symbols of the received signal. In direct (also sometimes called "incoherent") detection, the phase information is ignored and only the intensity of the received optical beam is ascertained. As a result, direct detection systems are often simpler and less costly to implement than their coherent counterparts. Such benefits, however, come at a cost: coherent systems often outperform direct detection systems in terms of their immunity to noise and interference. Intensity modulation (IM) is one class of signal modulation that is specifically suited for direct detection. In IM, information is encoded into the optical signal as variations in the optical output power of a source and therefore the detected intensity variations can lead to the recovery of the modulated signals. Pulse width modulation is a subset of intensity modulation. Pulse Amplitude Modulation, On-Off Keying and Pulse Position Modulation are also subsets of intensity modulation.

One of the challenges in laser communications ("Lasercom") relates to the propagation of the optical beams through the atmosphere. More specifically, atmospheric turbulence leads to scintillation, causing the amount of light that is received at a receiver to vary in time because of atmospheric interference effects. Such variations can be especially problematic for intensity-modulated direct detection techniques that rely on variations in intensity of the optical beam to recover the modulated information.

One solution to mitigate such adverse effects of atmospheric propagation is to use intensity modulated direct detection with multiple beams. For example, multiple transmitters can be implemented that transmit simultaneous intensity modulated beams (e.g., light beams that are turned on and off or otherwise modulated at the same time) that do not have phase coherence and thus do not interfere with one another at the receiver. That is, due to a lack of phase correlation, the received optical signals do not add constructively or destructively, but rather such received signals can be treated as non-interfering signals. Each of the received beams has a fluctuating power signal, but because the received signals are independent or uncorrelated, those fluctuations are reduced when the signals are summed together in the detector. One of the problems associated with such a multi-beaming technique, however, is the complexity of the system, which requires several transmitters to be used and operated in a synchronized manner to transmit multiple beams, generally all at the same time and aligned to point in the same direction.

The disclosed embodiments relate to direct detection of intensity modulated signals that use a single broad spectrum light source yet enable the transmission and/or detection of multiple beams. The disclosed technology improves the detection capabilities of a direct detection system while enabling a cost-effective and simple design by eliminating the need for multiple transmitters and associated components, such as additional modulators, as well as reducing the operational overhead, such as additional alignment and calibration procedures.

In some embodiments, a broad spectrum source is used on the transmitter side of the free space optical communication system, and intentional time delays of predetermined durations are introduced in different sections of the beam. Because the source has a broad spectrum, the introduced delays remove the coherence effects among the corresponding beam sections, thus effectively transforming the single source into multiple transmitters. As such, in some embodiments, a single light source and a single modulator is used to effectuate an intensity modulated direct detection (IMDD) system with multi-beams.

Figure 2A:
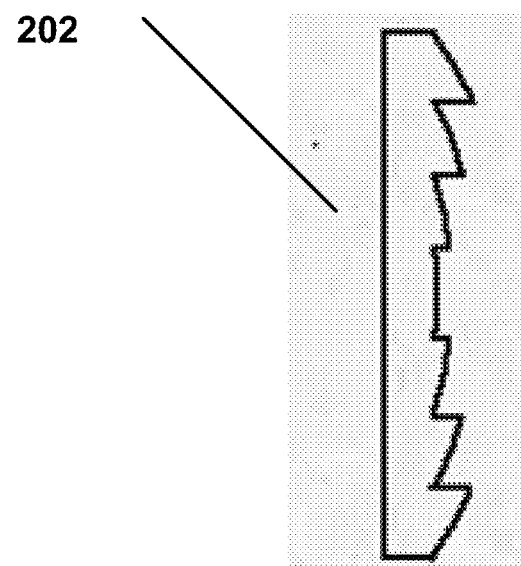
FIG. 2A is a simplified diagram illustrating side view of two Fresnel lenses.
Figure 2B:
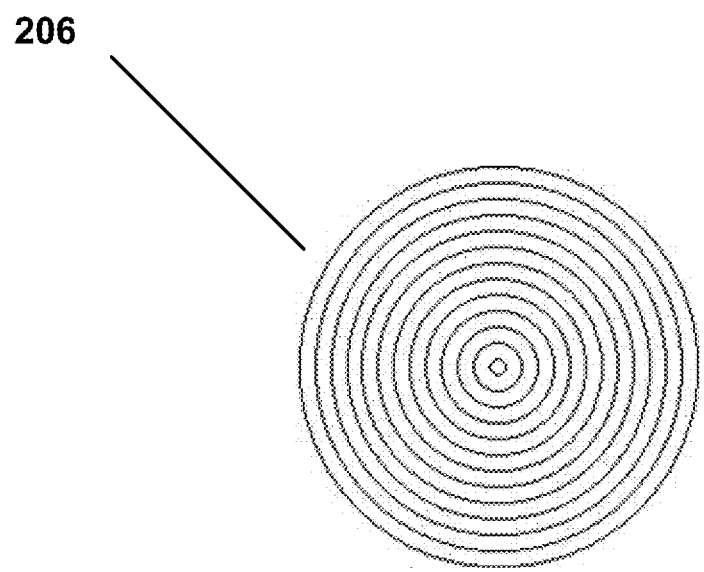
FIG. 2B is a simplified diagram illustrating a top view of a Fresnel lens.

The intentional delays can be introduced using several mechanisms. One very convenient way is to use a Fresnel lens, which commonly has a low cost. FIG. 2A is a lens diagram illustrating side views of an example Fresnel lens 202 and FIG. 2B shows an exemplary top view of a Fresnel lens 206. Fresnel lenses with different thicknesses, different edge shapes, and different material can be formed to produce the desired focusing and diffractive properties of light that passes through the lenses. In the most general sense, the Fresnel lens design allows the construction of a lens with a large aperture and a short focal length without the mass and volume of material that would be required for a lens of conventional design. In particular, Fresnel lenses can be made much thinner than comparable conventional lenses, and in some cases taking the form of a flat sheet. As evident from FIG. 2A, the optical path lengths for a light beam propagates through a Fresnel lens vary across different zones or annular sections of the Fresnel lens due to varying thicknesses of those zones or sections. Therefore, each section or zone of the Fresnel lens introduces a different delay in a corresponding section of the optical beam that impinges on the Fresnel lens.

Figure 3A:
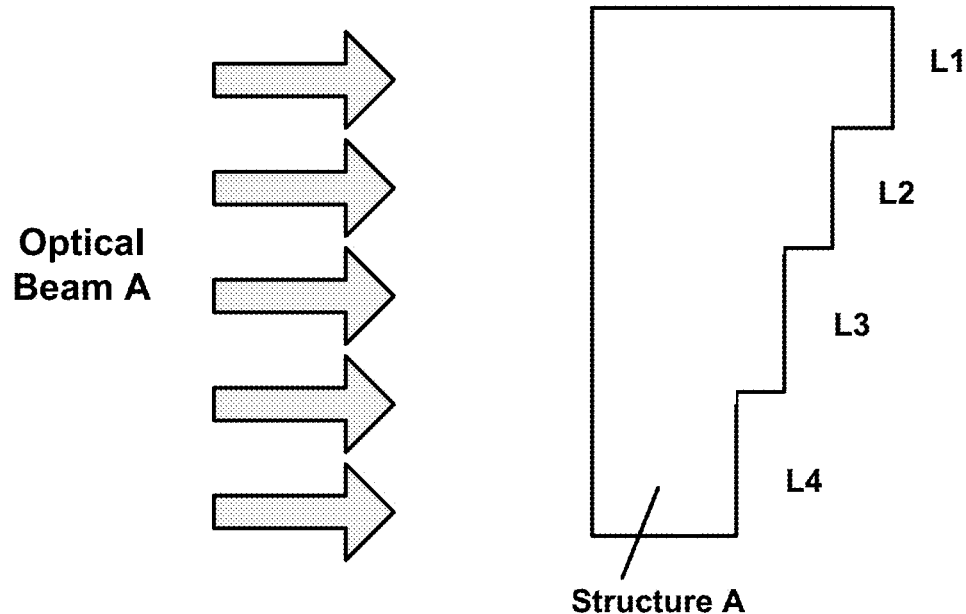
FIG. 3A is a simplified diagram illustrating an optical beam that is incident on a specially designed structure in accordance with an example embodiment.
Figure 3B:
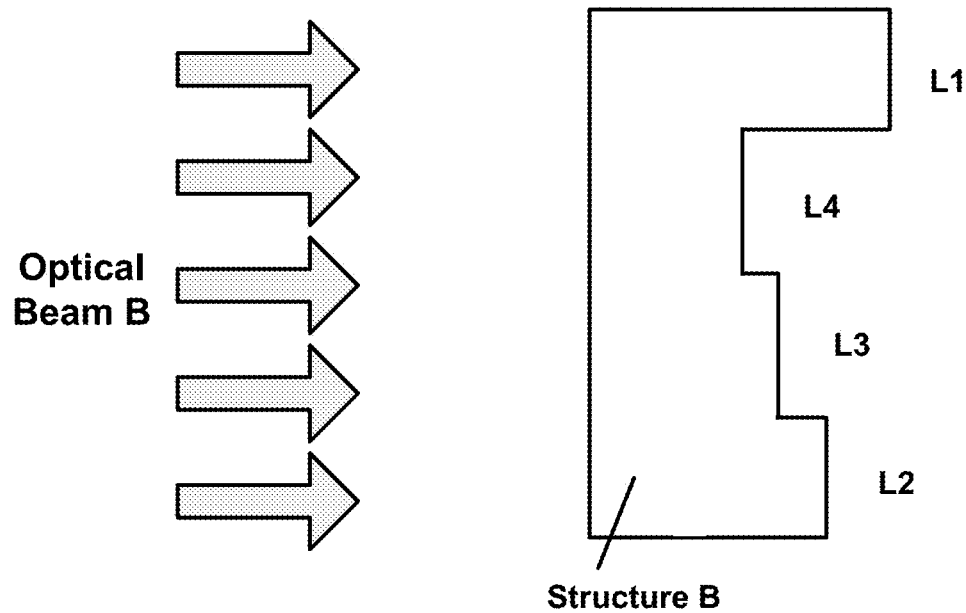
FIG. 3B is a simplified diagram illustrating an optical beam that is incident on another specially designed structure in accordance with an example embodiment.

In some exemplary embodiments, proper amounts of delay are introduced into the optical beam using a specially designed component other than a Fresnel lens. For example, FIG. 3A is a block diagram that illustrates a specially designed Structure A with a step-like profile with four sections. The sections of the Structure A are characterized as having different optical path differences, L1 to L4, that introduce different amounts of delay into the optical beam, such as Optical Beam A from, e.g., a fiber end, which propagates through those sections. FIG. 3B shows another block diagram that illustrates a specifically designed Structure B with a step profile that introduces similar delays as in FIG. 3A but with a modified spatial arrangement of the step profile of Structure B. By the way of example, FIG. 3B illustrates a collimated Optical Beam B that is incident on Structure B. The structures that are shown in FIGS. 3A and 3B can be readily manufactured at a low cost. Other exemplary optical structures with different shapes and profiles, and comprising different materials, can be constructed to provide specific delays into the optical beam.

The light sources for implementing the disclosed systems can have a relatively broad spectrum. In some implementation, the light source includes one or more of the following light sources: a broad-band laser diode (LD), a superluminescent diode (SLD), a light-emitting diode (LED), or an amplified spontaneous emission (ASE) source. An SLD is typically an edge-emitting semiconductor light source based on superluminescence, which combines the high power and brightness of laser diodes with the low coherence of conventional light-emitting diodes. The emission band of an SLD can be 5-100 nm wide.

In some embodiments, when the optical signal is modulated with data at a symbol rate, r, the spectral bandwidth of the light source, $\Delta f$, is selected to be much wider than r. That is, $\Delta f \gg r$. It should be noted that symbol rate, r, and symbol duration, $T_S$, have an inverse relationship: $T_S = 1/r$. In implementations where the delays are introduced into the transmit beam, an optical component, such as a Fresnel lens, introduces delays into different sections of the transmit aperture (i.e., the sub-apertures) such that the optical path difference, L, introduced in each section follows the following relationships: $L \ll c/r$ and $L \gg c/\Delta f$, where c is the speed of light. The first relationship, $L \ll c/r$, or equivalently, $L \ll c\,T_S$, ensures that the spatial modulation is not impaired by mis-timing and also reduces intersymbol interference. The second relationship, $L \gg c/\Delta f$, ensures that each delayed section of the beam is incoherent with other sections of the beam. That is, the optical path difference is selected to be much larger than the spatial extent of a symbol.

In some example implementations, where a Fresnel lens with N circular zones is used, N different delays are introduced into the optical beam. The total difference in path length between the center and edge zones can be characterized as:

$$NL_{Shift} = \sqrt{f^2 + R^2} - f \qquad (1).$$

Figure 4A:
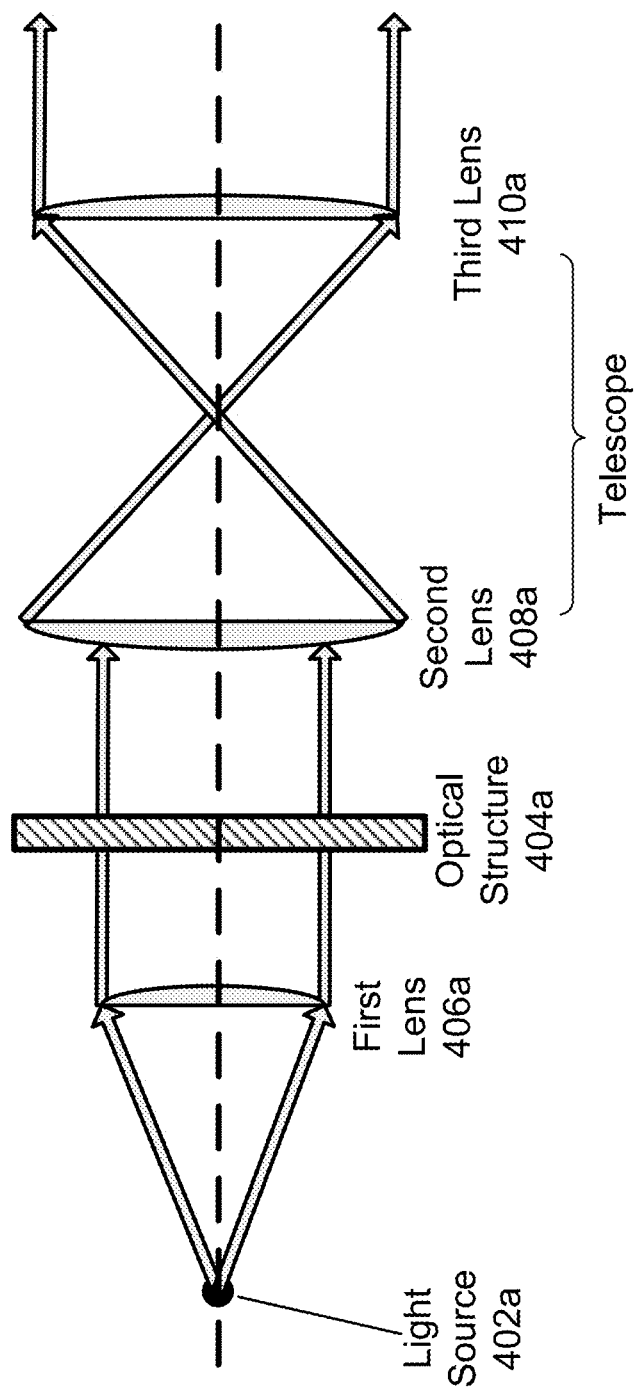
FIG. 4A is a simplified diagram illustrating positioning of optical structures within a telescope-like configuration in accordance with an example embodiment.

In Equation (1), $L_{Shift}$ is the optical path difference introduced by each zone, f is the focal length of the lens, and R is the radius of the last zone of the Fresnel lens as measured from the center of the lens. For the above example implementations, $NL_{Shift} \ll cT_S$ to reduce intersymbol interference, and $L_{Shift} \gg c/\Delta f$ so that light that exits each zone lacks coherence with light exiting other zones of the Fresnel lens. As a result, the intensity from each zone adds in the far field without interference. In such implementations where the above described Fresnel lens is used for transmission of the optical beam, the receiver that receives the transmitted light in the far field detects the total energy of the incident beam, including light from each of the zones of the transmit aperture. As noted earlier, due to lack of coherency of the received beams, the detected energy of at the receiver is the sum of energies from each zone, regardless of their phase differences. Because the received optical signals are not coherent, the noise due to atmospheric propagation is reduced in the aggregate signal. Increasing the number, N, of non-coherent signals produced at the transmitter and received at the receiver further improves the signal-to-noise ratio of the detected optical signal FIG. 4A through FIG. 4E show different examples of optical systems that include the disclosed optical components for introducing different amounts of delay in different sections of an optical beam. FIG. 4A illustrates a first lens 406a that is positioned to receive light from a light source 402a and to produce a collimated light beam that is incident on an optical structure 404a. The optical structure 404a introduces different amounts of delay in different sections of the optical beam. The optical structure 404a can, for example, be a plate structure such as any of the example structures shown in FIGS. 3A and 3B. The optical beam that exits the optical structure 404a is incident on a second lens 408a and subsequently on a third lens 410a, which produces a collimated output beam. The second lens 408a and third lens 410a form a telescope structure.

Figure 4B:
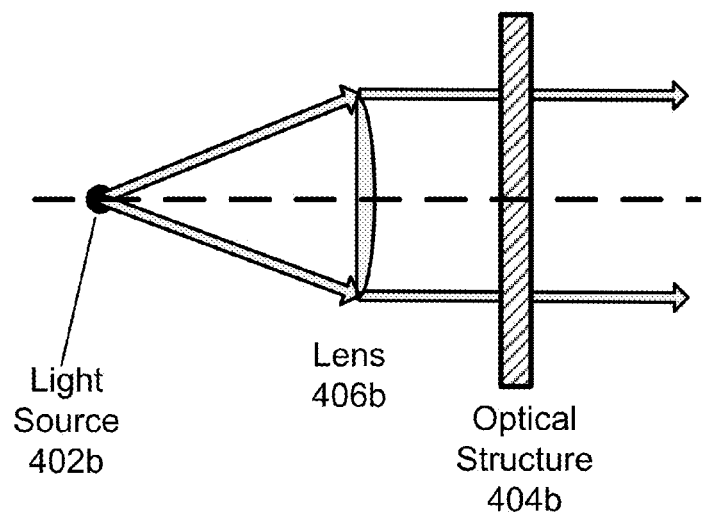
FIG. 4B is a simplified diagram illustrating an optical system that includes a lens and an optical structure for introducing delays in different sections of an optical beam in accordance with an example embodiment.
Figure 4C:
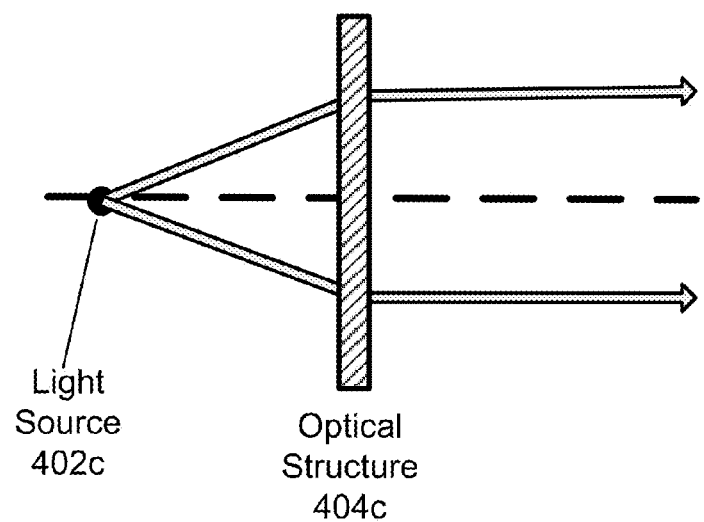
FIG. 4C is a simplified diagram illustrating an optical system that includes an optical structure for introducing delays in different sections of an optical beam in accordance with another example embodiment.

FIG. 4B illustrates a lens 406b that is positioned to received light from a light source 402b. The collimated light that exits the lens 406b impinges upon an optical structure 404b that introduces different amounts of delay in different sections of the optical beam. The optical structure 404b can, for example, be a plate structure such as any of the example structures shown in FIGS. 3A and 3B. In FIG. 4C, the optical beam produced by the light source 402c is received by an optical structure 404c that introduces different amounts of delay in different sections of the optical beam upon exit from the optical structure 404c. The optical structure 404c can, for example, be a Fresnel Lens.

Figure 4D:
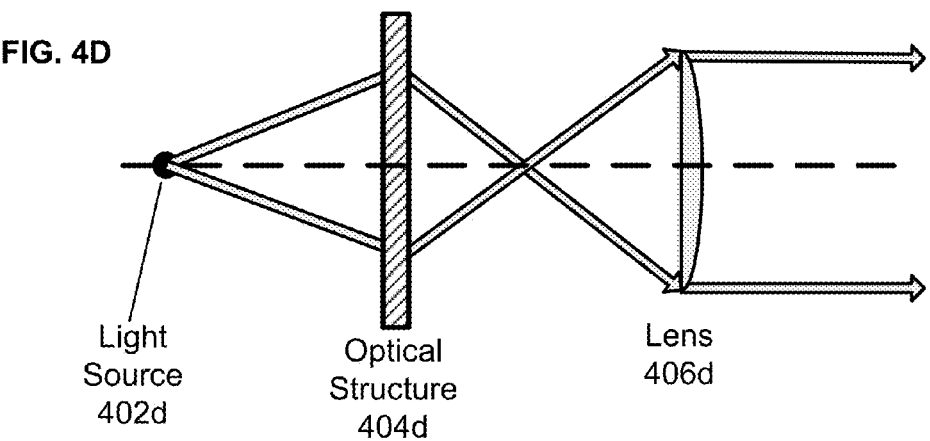
FIG. 4D is a simplified diagram illustrating an optical system that includes a lens and an optical structure for introducing delays in different sections of an optical beam in accordance with another example embodiment.
Figure 4E:
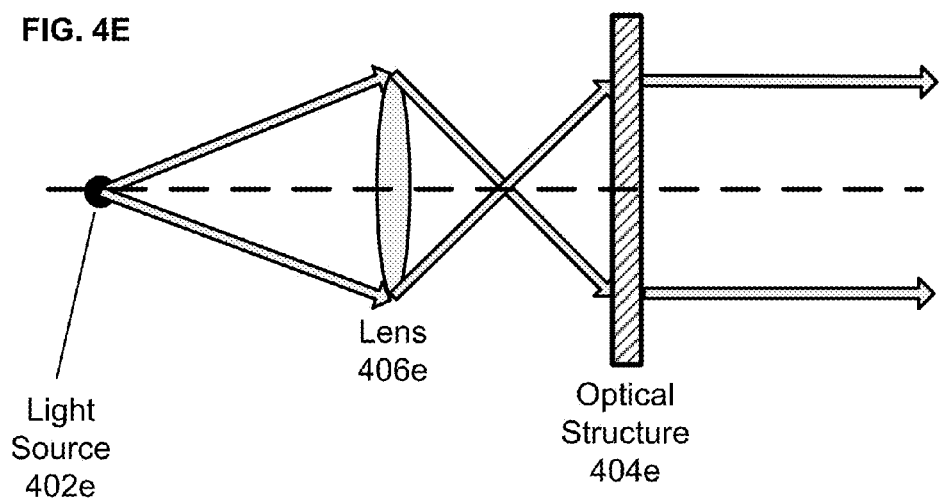
FIG. 4E is a simplified diagram illustrating an optical system that includes a lens and an optical structure for introducing delays in different sections of an optical beam in accordance with another example embodiment.

FIG. 4D shows another configuration in which light from a light source 402d is received at an optical structure 404d that introduces different amounts of delay in different sections of the optical beam. The optical structure 404d can, for example, be a Fresnel Lens. The light that exits the optical structure 404d is received by lens 406d, which produces a collimated output beam. In FIG. 4E, the light from a light source 402e is received at a lens 406e and is subsequently incident on an optical structure 404e that introduces different amounts of delay in different sections of the optical beam. The optical structure 404e can, for example, be a Fresnel Lens.

In some example embodiments, more than one optical structure can be placed within the optical transmitter to introduce delays. Such structures can produce delays in either a cumulative fashion (e.g., each structure produces a certain amount of delay that adds to the optical delay produced by other structure(s)) or separately (e.g., each structure operates on a different portion of the beam).

Figure 5:
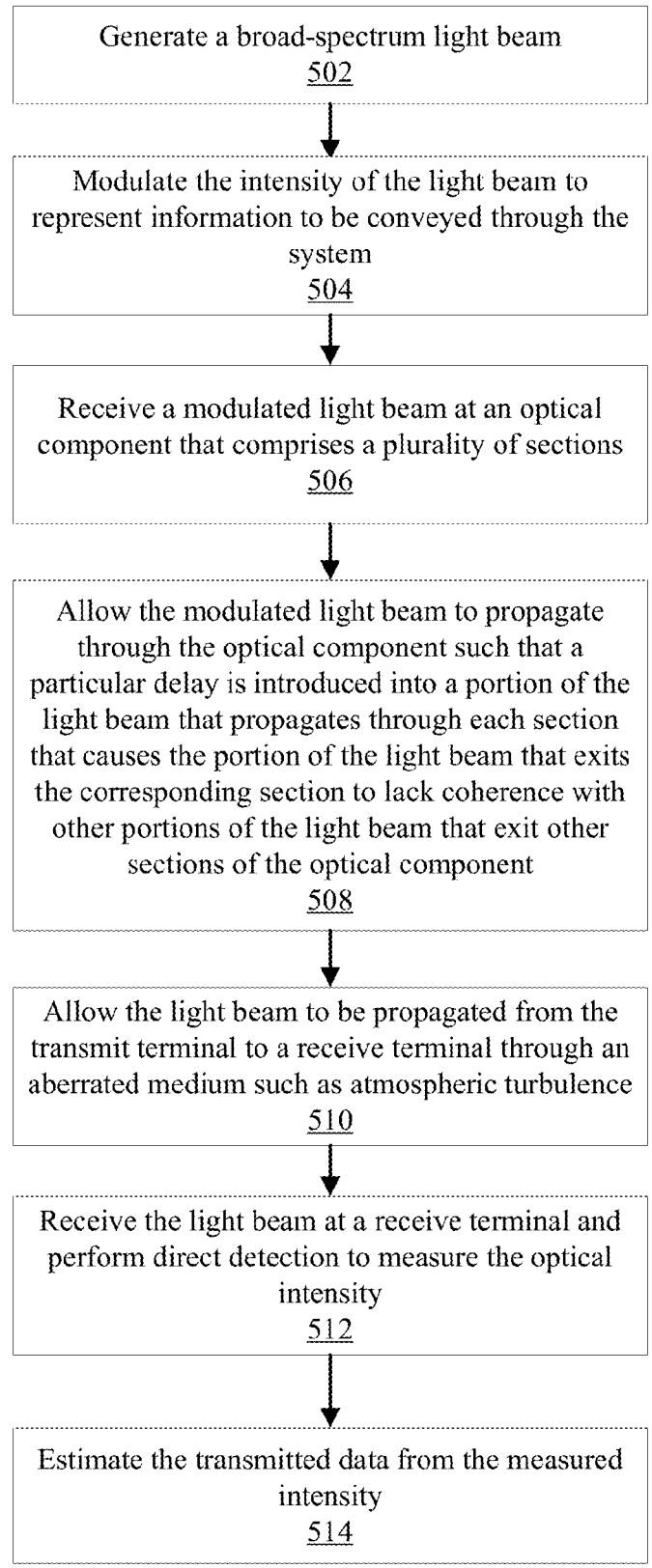
FIG. 5 is a block diagram illustrating a set of operations that can be carried out to allow transmission of multiple beams in a free space optical communication system in accordance with an example embodiment.

FIG. 5 illustrates a set of operations that can be carried out to allow transmission of multiple beams in a free space optical communication system. At block 502, a broad-spectrum light beam is generated. At block 504, the intensity of the light beam is modulated to represent information to be conveyed through the system. At block 506, the modulated light beam is received at an optical component that comprises a plurality of sections. At block 508, the modulated light beam is allowed to propagate through the optical component. Each section of the optical component that is illuminated by the light beam introduces a particular delay into a portion of the light beam that propagates through such section, and each particular delay introduced by a corresponding section of the optical component causes the portion of the light beam that exits the corresponding section to lack coherence with other portions of the light beam that exit other sections of the optical component. At block 510, the output light beam is transmitted from the transmitter, or the transmit terminal, to a receive terminal through an aberrated medium such as the atmosphere having atmospheric turbulence. The received optical beam has varying amounts of delay that are incoherent with respect to one another, and thus can be combined using direct detection of the received light intensities. At block 512, the light beam is received at a receive terminal and direct detection is performed to measure the optical intensity of the received light beam. At block 514, the transmitted data is estimated from the measured intensity.

In some embodiments, the modulated light beam has a modulation rate, r, and an optical path difference associated with each section of the optical component is smaller than $c/r$, where c is the speed of light in vacuum. For example, optical path difference is at least an order of magnitude smaller than $c/r$. According to some embodiments, an optical path difference associated with each section of the optical component is larger than $c/\Delta f$, where c is the speed of light and $\Delta f$ is the spectral bandwidth of a broad spectrum light source that produces the modulated light beam. For example, the optical path difference is at least two orders of magnitude larger than $c/\Delta f$. In some embodiments, the modulated light beam is one of an intensity modulated light beam. In some exemplary embodiments, where the modulated light beam has a modulation rate, r, and the modulated light beam is produced using a light source with a spectral bandwidth that is larger than r. For example, the spectral bandwidth that is at least an order of magnitude larger than r.

In some embodiments, the optical component is a Fresnel lens with a plurality of circular zones, where each of the plurality of sections corresponds to one circular zone of the Fresnel lens. In some embodiments, the optical component is a plate with a step-like spatial profile that includes a plurality of segments, and each of the plurality of sections corresponds to one segment of the plurality of segments of the plate. In some embodiments, the operations of FIG. 5 further include providing a plurality of the portions of optical beam, subsequent to propagation through the multiple sections of the optical component, for transmission onto atmosphere.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, devices, modules and systems, as well as in different sequential orders. Any disclosed implementation or embodiment may further be combined with any other disclosed implementation or embodiment.

What is claimed is:

1. An optical transmitter for transmitting light in a free space optical communication system, comprising:
   a broad spectrum light source; and
   an optical component including a plurality of sections and positioned to receive an optical beam produced by the broad spectrum light source, wherein:
      the plurality of sections are formed to introduce optical path differences into portions of the optical beam that impinge on the optical component such that each section introduces a delay into a corresponding portion of the optical beam that is different from a delay introduced into other portions of the optical beam by other sections of the optical component,
      the delays introduced by the plurality of sections cause each portion of the optical beam that impinges on a corresponding section of the optical component to lack coherence with other portions of the optical beam that impinge on other sections of the optical component, and
      the optical beam received by the optical component is a modulated optical beam having a modulation rate, r, the light source has a spectral bandwidth, $\Delta f$, that is larger than r, each of the plurality of the sections of the optical component is formed to introduce a particular optical path difference that is larger than $c/\Delta f$ and is also smaller than $c/r$, where c is the speed of light in vacuum.

2. The optical transmitter of claim 1, wherein the optical beam received by the optical component is one of an intensity modulated optical beam.

3. The optical transmitter of claim 1, wherein the broad spectrum light source is one of: a broad-band laser diode (LD), a super-luminescent diode (SLD), a light-emitting diode (LED), or an amplified spontaneous emission (ASE) source.

4. The optical transmitter of claim 1, wherein:
the optical component is a Fresnel lens with a plurality of circular zones, and
each of the plurality of sections corresponds to one circular zone of the Fresnel lens.

5. The optical transmitter of claim 1, wherein:
the optical component is a plate with a step-like spatial profile including a plurality of segments, and
each of the plurality of sections corresponds to one segment of the plurality of segments of the plate.

6. The optical transmitter of claim 1, wherein the broad spectrum light source and the optical component are located inside one or both of (a) an unmanned flying vehicle or (b) a ground-based station, and the optical component is positioned to provide a plurality of the portions of optical beam, after propagation through the multiple sections of the optical component, for transmission onto atmosphere.

7. The optical transmitter of claim 1, wherein the optical component is positioned at the exit aperture of the optical transmitter.

8. A method for producing multiple beams for transmission at a free space optical communication system, comprising:
receiving a modulated light beam at an optical component that comprises a plurality of sections; and
allowing the modulated light beam to propagate through the optical component,
wherein:
each section of the optical component that is illuminated by the light beam introduces a particular delay into a portion of the light beam that propagates through such section,
each particular delay introduced by a corresponding section of the optical component causes the portion of the light beam that exits the corresponding section to lack coherence with other portions of the light beam that exits other sections of the optical component, and
the optical beam received by the optical component has a modulation rate, r, and is produced by a light source having a spectral bandwidth, $\Delta f$, that is larger than r, each of the plurality of the sections of the optical component is formed to introduce a particular optical path difference that is larger than $c/\Delta f$ and is also smaller than $c/r$, where c is the speed of light in vacuum.

9. The method of claim 8, wherein the modulated light beam is one of an intensity modulated light beam.

10. The method of claim 8, wherein the optical component is a Fresnel lens with a plurality of circular zones, and each of the plurality of sections corresponds to one circular zone of the Fresnel lens.

11. The method of claim 8, wherein the optical component is a plate with a step-like spatial profile including a plurality of segments, and each of the plurality of sections corresponds to one segment of the plurality of segments of the plate.

12. The method of claim 8, further comprising transmitting a plurality of the portions of optical beam, subsequent to propagation through the multiple sections of the optical component, through atmosphere.

13. A free space optical communication system, comprising:
a transmitter, comprising:
a broad spectrum light source; and
an optical component including a plurality of sections and positioned to receive an optical beam produced by the broad spectrum light source, wherein:
the plurality of sections are formed to introduce optical path differences into portions of the optical beam that impinge on the optical component such that each section introduces a delay into a corresponding portion of the optical beam that is different from a delay introduced into other portions of the optical beam by other sections of the optical component,
the delays introduced by the plurality of sections cause each portion of the optical beam that impinges on a corresponding section of the optical component to lack coherence with other portions of the optical beam that impinge on other sections of the optical component,
the optical beam received by the optical component is a modulated optical beam having a modulation rate, r, the light source has a spectral bandwidth, $\Delta f$, that is larger than r, each of the plurality of the sections of the optical component is formed to introduce a particular optical path difference that is larger than $c/\Delta f$ and is also smaller than $c/r$, where c is the speed of light in vacuum; and
a receiver positioned to receive a plurality of the portions of the optical beam that exits the optical component and propagates through atmosphere, the receiver including a photodetector to sense an intensity of the received portions of the optical beam.

14. The free space optical communication system of claim 13, wherein the broad spectrum light source is one of: a broad-band laser diode (LD), a super-luminescent diode (SLD), a light-emitting diode (LED), or an amplified spontaneous emission (ASE) source.

* * * * *